M. TAILLARDAT.
FLOOR.
APPLICATION FILED MAR. 20, 1920.

1,434,756.

Patented Nov. 7, 1922.
4 SHEETS—SHEET 1.

Inventor
M. Taillardat,
By H. R. Kerslake
Attorney

M. TAILLARDAT.
FLOOR.
APPLICATION FILED MAR. 20, 1920.

1,434,756.

Patented Nov. 7, 1922.

Inventor
M. Taillardat,
By H. R. Kerslake
Attorney

M. TAILLARDAT.
FLOOR.
APPLICATION FILED MAR. 20, 1920.

1,434,756.

Patented Nov. 7, 1922.
4 SHEETS—SHEET 3.

Inventor
M. Taillardat,
By H. R. Kerslake
Attorney

M. TAILLARDAT.
FLOOR.
APPLICATION FILED MAR. 20, 1920.

1,434,756.

Patented Nov. 7, 1922.
4 SHEETS—SHEET 4.

Inventor
M. Taillardat,
By H. R. Kerslake
Attorney

Patented Nov. 7, 1922.

1,434,756

UNITED STATES PATENT OFFICE.

MICHEL TAILLARDAT, OF CLICHY, FRANCE.

FLOOR.

Application filed March 20, 1920. Serial No. 367,744.

*To all whom it may concern:*

Be it known that I, MICHEL TAILLARDAT, of 109 Boulevard Victor Hugo, Clichy, Seine, France, joiner, have invented a Floor, of which the following is a full, clear, and exact description.

In many premises where heat or dampness prevails, it is not possible to cover the floor with a wooden flooring; in fact, the wood laid in the ordinary conditions in these hot or damp places, becomes distorted and disjoined and rises. Hitherto it was therefore necessary to cover the ground of these premises with slabs, cement coatings and the like.

In many cases, however, it would be very desirable to be able to provide these premises with floors. The slabs, even the ceramics which are now frequently used, the cement floorings, have the disadvantage of being cold, noisy and do not give the impression of comfort of wooden floorings.

This invention has for its object to remedy this disadvantage and to provide an undeformable floor which does not rise, swell or heave under the action of the heat or dampness and which, moreover, has a very nice decorative appearance.

It is substantially characterized by the combination of wooden slabs composed themselves of wooden squares or plates and of cement blocks made integral with these slabs by means of wires, or metal rods, which are arranged in grooves or cavities of suitable shape provided in the wood, pass through the latter and are embedded in the cement mass.

The whole of the wooden slab and of the cement block constitutes an industrial product which can be easily transported and brought to the place where it is to be used.

The grooves in the plates are lined with wooden tongues which form a decoration and contribute to give to the new slab a nice appearance.

A characteristic arrangement consists in constituting the slabs by means of juxtaposed wooden plates arranged diagonally or parallel to one of the edges, these plates being provided on their under face with ribs serving for the passage of the wires adapted to connect the plates to the cement or other material and serving also to ensure by themselves the connection with this cement.

Another improvement consists in the method of fixing the metallic reinforcement to the wooden slabs, so as to avoid passing it entirely through these slabs. For that purpose, wires are arranged under the slabs and retained on the latter by staples driven into the wood.

Instead of using this arrangement, the wires may be retained in position by placing them in grooves presented by the slabs on their sides and by causing them to pass diagonally through the edges of the slabs.

Some forms of carrying out these new arrangements are illustrated by way of example only, in the accompanying drawings in which.

Figure 1:
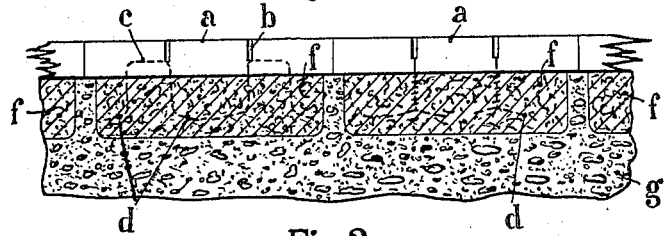
Fig. 1 is a vertical section of a floor constructed of the new slabs.

As illustrated in the drawings, Figure 1, the new floor is composed of wooden slabs $a$, of square shape, but which might as well have a hexagonal or octagonal shape.

Figure 5:
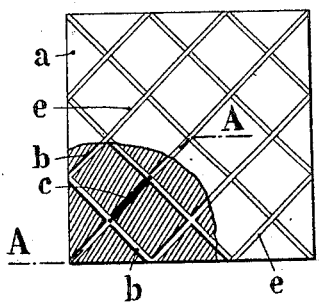
Fig. 5 is a corresponding plan view partly in section.
Figure 7:
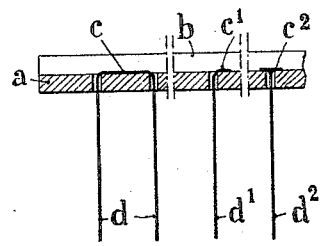
Fig. 7 is a section on line A—A of Fig. 5.
Figure 6:
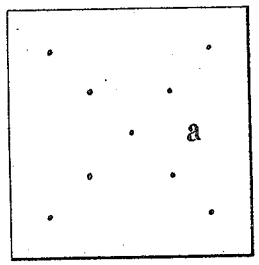
Fig. 6 is a plan view from underneath.
Figure 12:
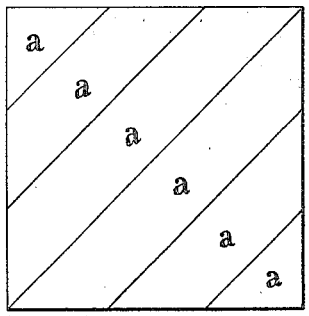
Fig. 12 is a front of another arrangement.

The top of each slab is provided with grooves $b$, Fig. 5, of any suitable shape and arrangement. In these grooves are arranged the heads $c$ or $c^1$, $c^2$ of wires or metal rods $d$ $d^1$ and $d^2$, respectively, see Fig. 7, which shows three forms of execution. In the first form of execution, a wire $d$ is bent twice at right angles and forms a kind of yoke the head of which rests in the bottom of the groove $b$ and the two branches $d$ of this wire pass in two holes made in the wood.

$d^1$ designates a wire the bent upper end $c^1$ of which forms in a similar manner a retaining device.

In the third form of execution, it has been supposed that the metal rod $d^2$ was provided with a head $c^2$ similar to the head of a brad.

Figure 2:
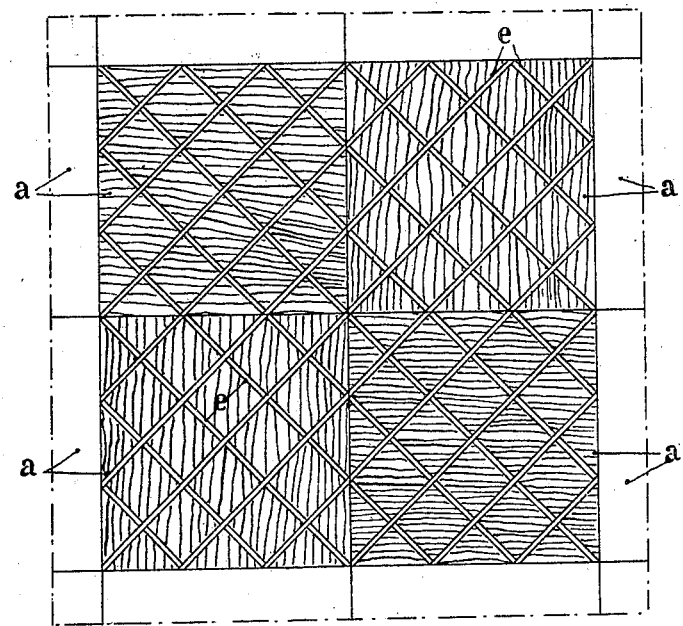
Fig. 2 is a corresponding plan view.
Figure 11:
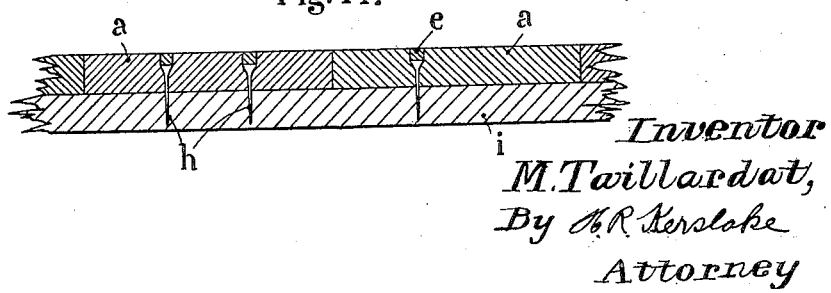

The heads $c$, $c^1$, $c^2$ are covered and concealed by wooden tongues, $e^1$, Figs. 2, 5 and 11, or in any other manner as desired.

Figure 8:
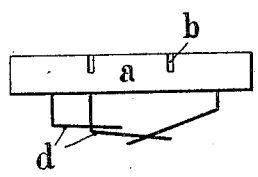
Fig. 8 shows the following stage of the manufacture.
Figure 9:
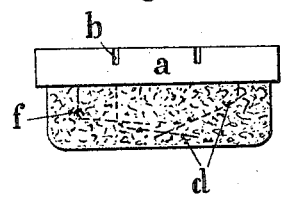
Fig. 9 is a side view of a completed slab.

The wooden slabs being thus prepared the wires are suitably bent down, as illustrated in Fig. 8; then the wooden slabs are fitted on moulds containing cement, so that after setting of the latter each wooden slab is integral with a cement block $f$, Fig. 9.

The slabs thus obtained are laid, at the required time, against each other on the area of the floor which is to receive the same, for instance on a layer of concrete $g$, Fig. 1, before setting of this concrete. The latter rises between the cement blocks and fills in the joints as illustrated in Fig. 1.

As shown in Fig. 2, the grain of the wood of the various slabs is crossed so, as to obtain a decorative effect and greater strength.

Instead of cement, the blocks $f$ can be made of mortar or agglomerate of suitable composition, the base of which is either lime and cement, or bitumen, tar, etc., mixed or not with cork, saw dust and similar materials.

It will be noted that in the new slabs, the wood is tightly bound to the cement block, thus giving to the latter a perfect rigidity and preventing any deformation, even if the premises are hot or damp.

Figure 10:
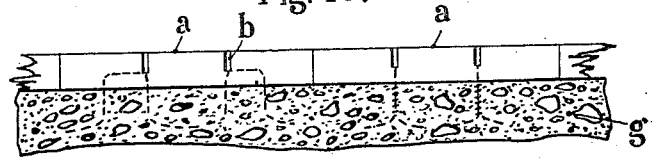
Figs. 10 and 11 are vertical sections of modifications.
Figure 3:
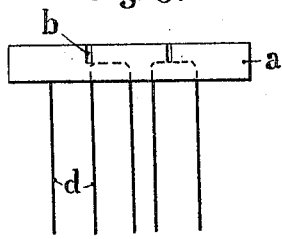
Figs. 3 and 4 are respectively an elevation and a corresponding side view of a slab element in course of manufacture.
Figure 4:
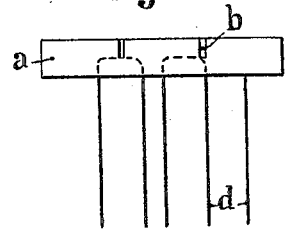

In certain cases, the new wooden slabs can be directly applied on a layer of concrete or other similar surface, without being previously provided with cement blocks $f$. It is then simply necessary to take the slabs such as they are shown in Fig. 3, to bend the wires as illustrated in Fig. 8 and to lay them on the layer of concrete before the latter has set, Fig. 10.

The new wooden slabs can also be directly applied, without cement, on a wooden flooring, a worn out flooring or a dead floor made of materials of secondary quality. In this case, the iron rods are replaced by brads $h$, Fig. 11, serving to nail the slabs on this flooring $i$.

The lower face of the wooden slabs is coated with a fireproofing product before application of the cement; the flooring is then completely incombustible.

Figure 15:
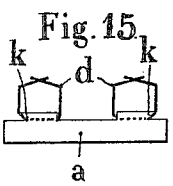
Fig. 15 is an end view corresponding to Fig. 14.
Figure 16:
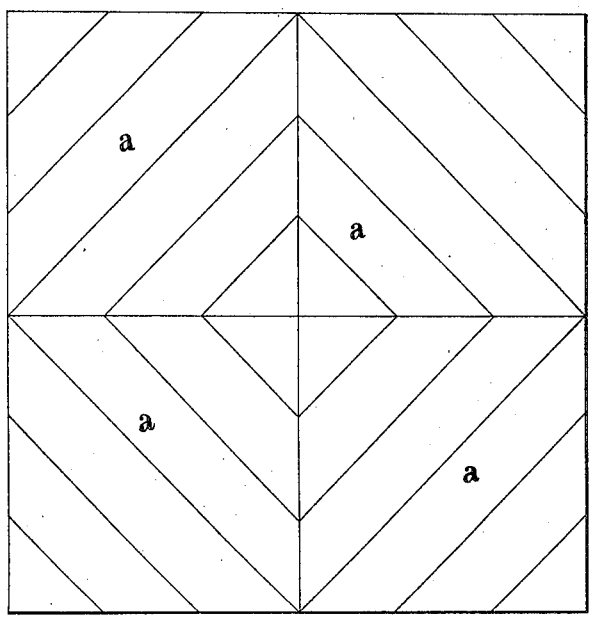
Fig. 16 shows the assemblage of four similar slabs.
Figure 17:
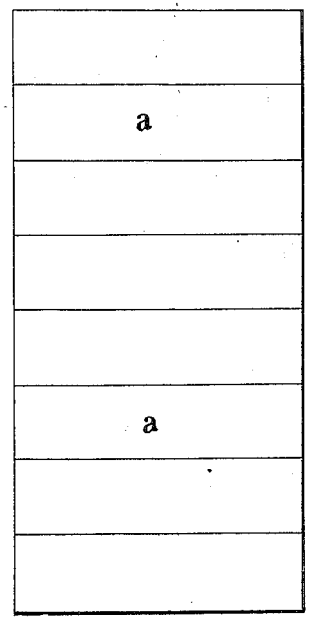

In the arrangement illustrated in Figs. 12 to 16, the new slab is constituted by a series of juxtaposed wooden plates $a$, and in Fig. 17, the plates are arranged in parallel relation.

Figure 13:
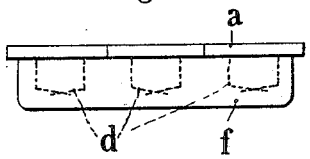
Fig. 13 is a corresponding side view.
Figure 14:
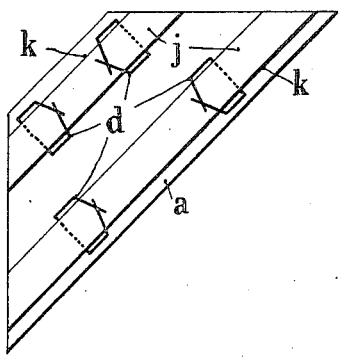
Fig. 14 shows apart, on an enlarged scale, one of the plates constituting the previous slab, seen from underneath.

The lower face of each of them is provided with ribs $j$ in which are formed conduits wherein pass the wires $d$ serving for the junction with the cement block $f$, Fig. 13.

These ribs have an inclined side $k$, as shown in Fig. 15. This arrangement ensures a still more efficient binding with the cement which fits under the bevel part of the ribs and maintains the edges of two adjacent plates at the same level.

By crossing the plates of the slabs, the appearance shown Fig. 16 is obtained.

Instead of arranging the plates obliquely, that is to say as herring bone parquetery, they can be placed at right angle, so as to obtain English flooring.

Figure 18:
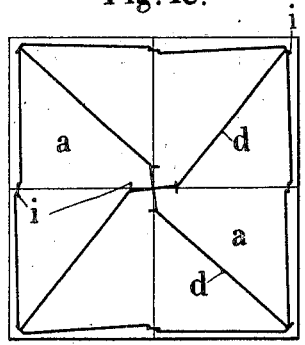
Figs. 17 to 21 illustrate modifications.
Figure 19:

In the modification shown in Figs. 18 and 19, each slab is composed of one or more wooden squares, as in the arrangement illustrated in Fig. 1.

As will be seen in Figs. 18 and 19, which shows the slab from underneath, the wires for connection with the cement are passed through staples $i$ driven into the wood plates $a$, without passing entirely through the same.

Figure 20:
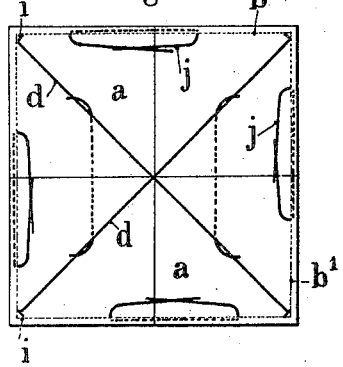
Figure 21:
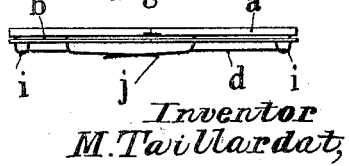

In the arrangement of Figs. 20 and 21, the slabs are provided with grooves $b^1$ formed in the side edges of the slabs. In the bottom of these grooves are arranged wires $j$ which pass obliquely through the wood and appear on the lower face thereof. Moreover, these wires $j$ may be combined, if desired, with other wires $d$ attached to staples $i$. The wires $j$ function to unite the blocks and to form means for tying the blocks to the concrete.

The new arrangements which have just been described have the advantage of causing the metal parts to pass only through a portion of the thickness of the wood; consequently, no metallic part whatever can be located on the upper side. All risks of rust and of consequent deterioration of the fiber are thus prevented.

The wooden slabs thus reinforced are made integral with cement blocks, or they are directly laid on a flooring of any suitable material, cement, bitumen, etc. Bitumen gives very good results; it adheres perfectly to the wood, renders the floor noiseless, light and perfectly water-proof.

Instead of reinforcements made of wires, as above described, the binding or connection of the wooden slabs with the part situated under the same can be effected by means of brads split in two or four parts. When these brads have been driven in the lower face of the slabs, they are opened so as to form branches which are embedded in the cement blocks or in the bitumen or cement flooring and render the wooden portion integral with the masonry portion.

In the drawings, it has been supposed that each slab was composed of four square members assembled together, the grain of the wood of these members being crossed, but the invention is not limited to this mode of construction of the slabs.

The above arrangements are only given by way of example; the forms, dimensions and detail arrangements may be varied according to the circumstances without departing thereby from the scope of the invention.

Claims:

1. Inner floor, wood squares, each formed of four united elements, each two diagonal elements having their fibers parallel, so that the fibers of the four elements are perpendicular with respect to each other, a block of concrete on which the elements rest, said elements being provided with grooves which traverse the wood, and U-shaped wires engaging said grooves and having their ends embedded in the concrete.

2. Inner floor, wood squares, each formed of four united elements having grooves, each two diagonally arranged elements having their fibers parallel so that the fibers of the four squares are perpendicular with respect to each other, a concrete foundation for said elements, and connecting hooks, formed of U-shaped metallic wires engaging said grooves and having their ends embedded in the concrete, said hooks simultaneously uniting the elements to each other and to the concrete.

3. Interior floor, wood squares, each formed of four united elements arranged edge to edge and forming a square figure, each two diagonal elements of the figure having their fibers parallel, so that the fibers of each element are perpendicular relative to the fibers of adjacent elements, a block of cement on which the elements rest, said elements being provided with grooves which traverse the wood, and metal wires engaging said grooves and having their ends embedded in the block of cement.

The foregoing specification of my "Floor," signed by me this 4th day of March 1920.

MICHEL TAILLARDAT.